M. Hawkins,
Shaft Coupling,

№ 53,143. Patented Mar. 13, 1866.

Witnesses.

Inventor.
Moses Hawkins
By his attorney

UNITED STATES PATENT OFFICE.

MOSES HAWKINS, OF DERBY, CONNECTICUT.

IMPROVEMENT IN SHAFT-COUPLINGS.

Specification forming part of Letters Patent No. 53,143, dated March 13, 1866.

*To all whom it may concern:*

Be it known that I, MOSES HAWKINS, of Derby, of New Haven county, in the State of Connecticut, have invented a new and useful Improvement in Shaft-Couplings; and I do hereby declare that the following is a full and exact description thereof, reference being had to the accompanying drawings, making part of this specification.

My invention relates to a novel method of coupling or connecting the ends of the separate lengths of a line of shafting, and has for its objects to effect a secure connection, which will maintain the several lengths in line permanently and without the employment of any bolts or projecting flanges; and to these ends my invention consists in coupling the ends of the shafts by means of an encircling cylindrical collar or sleeve, and cross-keys passing through holes in said collar and depressions in the shafts, and longitudinal feathers on the shafts fitting into grooves in the said collar, all as hereinafter more fully set forth.

To enable those skilled in the art to make and use my invention, I will proceed to describe it more fully, referring by letters to the accompanying drawings, forming part of this specification, and in which—

Figure 1:
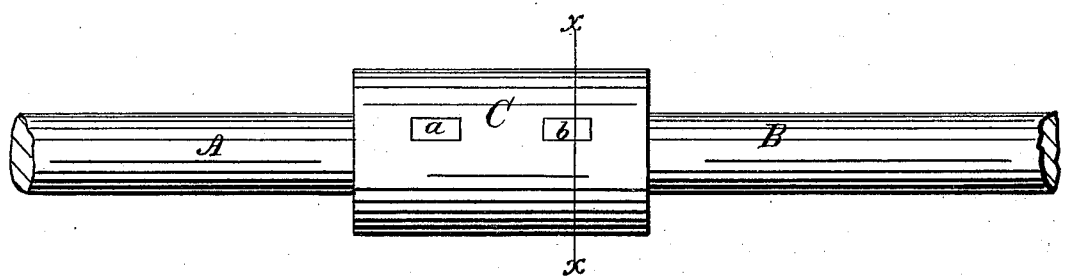
Figure 2:
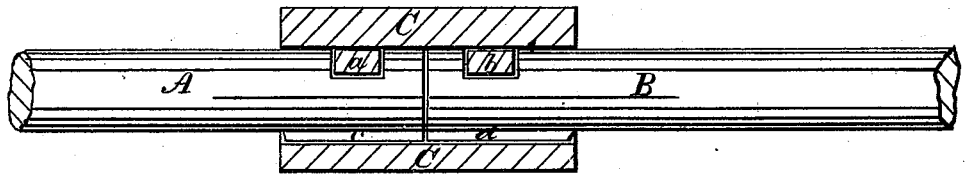
Figure 3:
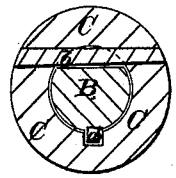

Figure 1 is an elevation of the ends (or portions) of two lengths of shafting coupled together in accordance with my invention. Fig. 2 is a longitudinal section of the same, and Fig. 3 is a cross-section at the line *x x*, Fig. 1.

In the several figures the same part is indicated by the same letter of reference.

A and B are two lengths of shafting, and C is a cast-iron sleeve or collar, the bore of which is just about sufficient to accommodate the diameter of the said shafts. The collar or sleeve C is cast with two holes or cavities through it crosswise (and about rectangular in cross-section) for the accommodation of two keys, *a* and *b*, which pass through said holes and also through cavities in the shafts A and B, as clearly seen at Figs. 2 and 3, to retain the shafts longitudinally within the sleeve C. On the interior of said sleeve C, running longitudinally, (and opposite to the holes for the keys just mentioned,) is cut a small groove, into which fit the two feathers *c* and *d* of the two shafts A and B, and between the adjacent ends of said shafts is placed a thin disk of rubber packing. (Seen in red at Fig. 2.)

It will be seen that by the combination of the devices as shown and described the two ends of shafts A B held within the sleeve C will be firmly secured in line and held longitudinally by the keys *a b* and said collar, while by means of the feathers *c d* the shafts will be caused to turn with the sleeve C and each other. It will be seen that if only the interior of sleeve C be bored true the keys *a b*, forcing the shafts down into the same line or portion of said bore, must bring said shafts in line.

The packing assists in inducing to a perfect fitting, and the whole, when locked together, effects the perfect coupling of the shafts without any bolts or projections, and in such manner that by simply unkeying the line may be broken for any purpose.

What I claim as new, and desire to secure by Letters Patent in the method of coupling shafting is—

The employment, in combination, of one or more feathers formed on (or locked to) the shafts longitudinally, a surrounding collar adapted to embrace the shaft's ends and receive said longitudinal feathers, and cross-keys passing through said collar and depression across slots in the shafts, the whole arranged to operate as specified.

MOSES HAWKINS. [L. S.]

In presence of—
  J. N. MCINTIRE,
  CHARLES SPEER.